(12) United States Patent
Nagano (10) Patent No.: US 9,191,543 B2
(45) Date of Patent: Nov. 17, 2015

(54) FACSIMILE APPARATUS

(71) Applicant: KYOCERA Document Solutions Inc., Osaka (JP)

(72) Inventor: Daisaku Nagano, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/445,389

(22) Filed: Jul. 29, 2014

(65) Prior Publication Data

US 2015/0055187 A1 Feb. 26, 2015

(30) Foreign Application Priority Data

Aug. 26, 2013 (JP) ................. 2013-174711

(51) Int. Cl.
*G06F 3/12* (2006.01)
*H04N 1/32* (2006.01)
*H04N 1/00* (2006.01)

(52) U.S. Cl.
CPC ............. *H04N 1/32* (2013.01); *H04N 1/00095* (2013.01)

(58) Field of Classification Search
None
See application file for complete search history.

(56) References Cited

U.S. PATENT DOCUMENTS

| | | | | |
|---|---|---|---|---|
| 6,188,766 B1 * | 2/2001 | Kocher | ........................ | 380/246 |
| 6,710,894 B1 * | 3/2004 | Ogawa | ........................ | 358/1.15 |
| 7,433,868 B1 * | 10/2008 | Satomi et al. | ........................ | 1/1 |
| 7,564,577 B2 * | 7/2009 | Atsumi | ........................ | 358/1.15 |
| 7,944,579 B2 * | 5/2011 | Connors | ........................ | 358/1.18 |
| 8,122,054 B2 * | 2/2012 | Kasatani | ........................ | 707/781 |
| 8,451,482 B2 * | 5/2013 | Masuyama | ........................ | 358/1.15 |
| 8,949,443 B2 * | 2/2015 | Izumi | ........................ | 709/228 |
| 2001/0054076 A1 * | 12/2001 | Tonegawa | ........................ | 709/206 |
| 2002/0054350 A1 * | 5/2002 | Kakigi et al. | ........................ | 358/1.16 |
| 2003/0072032 A1 * | 4/2003 | Maemura | ........................ | 358/1.15 |
| 2003/0081261 A1 * | 5/2003 | Tanimoto | ........................ | 358/400 |
| 2003/0174360 A1 * | 9/2003 | Ohshima | ........................ | 358/1.15 |
| 2003/0193692 A1 * | 10/2003 | Matsuyama | ........................ | 358/2.1 |
| 2004/0051899 A1 * | 3/2004 | Saitoh et al. | ........................ | 358/1.14 |
| 2004/0243697 A1 * | 12/2004 | Otsuka et al. | ........................ | 709/223 |
| 2005/0002065 A1 * | 1/2005 | Kotaka et al. | ........................ | 358/400 |
| 2005/0018240 A1 * | 1/2005 | Shima et al. | ........................ | 358/1.15 |
| 2005/0068565 A1 * | 3/2005 | Maeda | ........................ | 358/1.15 |
| 2006/0025175 A1 * | 2/2006 | Lapstun et al. | ........................ | 455/556.1 |
| 2006/0069807 A1 * | 3/2006 | Tagawa | ........................ | 709/245 |

(Continued)

FOREIGN PATENT DOCUMENTS

JP 2002-247236 A 8/2002

*Primary Examiner* — Madelein Nguyen
(74) *Attorney, Agent, or Firm* — Studebaker & Brackett PC (57) ABSTRACT

A facsimile apparatus uses IP addresses in facsimile communications. A communicating section receives image data sent from a communication partner apparatus via a facsimile transmission, based on an IP address of the communication partner apparatus and of the facsimile apparatus. A printing section prints the image data. An IP address registering section registers therein, in advance, an IP address of each of one or more communication partner apparatuses. An IP address obtaining section obtains the IP address of the communication partner apparatus. A printing rejection processing section judges whether the obtained IP address has already been registered. If the obtained IP address is determined as an unregistered IP address, the printing rejection processing section performs a printing rejecting process, and the printing rejection information storing section stores therein a specifying image and the unregistered IP address as printing rejection information. A notifying section provides printing rejection information as a notification.

12 Claims, 6 Drawing Sheets

(56) References Cited

U.S. PATENT DOCUMENTS

| | | |
|---|---|---|
| 2006/0077422 A1* | 4/2006 | Mathieson et al. .......... 358/1.15 |
| 2006/0170963 A1* | 8/2006 | Aoki ............................ 358/1.15 |
| 2006/0250644 A1* | 11/2006 | Yamauchi et al. ........... 358/1.15 |
| 2007/0089053 A1* | 4/2007 | Uhlig et al. .................... 715/513 |
| 2008/0068642 A1* | 3/2008 | Takahashi .................... 358/1.15 |
| 2008/0117447 A1* | 5/2008 | Okada et al. ................. 358/1.13 |
| 2008/0117475 A1* | 5/2008 | Ozawa et al. ................. 358/435 |
| 2008/0174803 A1* | 7/2008 | Matsuba ....................... 358/1.13 |
| 2008/0204784 A1* | 8/2008 | Nakashima ................... 358/1.13 |
| 2010/0053658 A1* | 3/2010 | Tamai et al. .................. 358/1.13 |
| 2010/0123932 A1* | 5/2010 | Nakamura .................... 358/1.15 |
| 2010/0134826 A1* | 6/2010 | Ishigure ....................... 358/1.15 |
| 2010/0169878 A1* | 7/2010 | Seki et al. ...................... 717/176 |
| 2010/0214590 A1* | 8/2010 | Ray et al. ...................... 358/1.14 |
| 2011/0075206 A1* | 3/2011 | Ando ........................... 358/1.15 |
| 2011/0239060 A1* | 9/2011 | Okada ............................ 714/57 |
| 2011/0242599 A1* | 10/2011 | Ohara ........................... 358/1.15 |
| 2012/0127519 A1* | 5/2012 | Kikuchi ........................ 358/1.15 |
| 2012/0254476 A1* | 10/2012 | De Souza et al. ............... 710/10 |
| 2012/0278467 A1* | 11/2012 | Schneider ...................... 709/223 |
| 2012/0293836 A1* | 11/2012 | Hiraike ......................... 358/1.15 |
| 2013/0086281 A1* | 4/2013 | Yada ............................. 709/245 |
| 2014/0333965 A1* | 11/2014 | Yamada et al. .............. 358/1.15 |
| 2014/0340717 A1* | 11/2014 | Meiyappan .................... 358/400 |
| 2014/0362404 A1* | 12/2014 | Miyasaka ..................... 358/1.15 |

\* cited by examiner

FACSIMILE APPARATUS

INCORPORATION BY REFERENCE

The present application claims priority under 35 U.S.C. §119 to Japanese Patent Application No. 2013-174711, filed Aug. 26, 2013. The contents of this application are incorporated herein by reference in their entirety.

BACKGROUND

The present disclosure relates to a facsimile apparatus that uses Internet Protocol (IP) addresses in facsimile communications.

Facsimile apparatuses are configured to read an original document, to generate image data of the original document, and to send, via a facsimile transmission, the generated image data to a communication partner facsimile apparatus. In other situations, facsimile apparatuses are configured to receive image data that has been sent from a communication partner facsimile apparatus via a facsimile transmission and to print a facsimile image represented by the received image data.

Facsimile communications that use analog telephone lines such as the G3 facsimile have widely been used. In recent years, due to the development of the Internet and intranet networks, facsimile communications that use email addresses and facsimile communications that use IP addresses are becoming popular.

Facsimile apparatuses have a function of informing a communication partner facsimile apparatuses of the facsimile number thereof (hereinafter, "sender number"). The sender number informing function is realized by a facsimile apparatus having registered therein, in advance, the facsimile number thereof that is set therewith (the sender number), so that a communication partner facsimile apparatus is informed of the sender number when the facsimile apparatus sends a facsimile thereto.

This function is, conversely, realized by a communication partner facsimile apparatus having registered therein, in advance, the facsimile number thereof that is set therewith, so that a receiving facsimile apparatus is informed of the sender number of the communication partner facsimile apparatus when the communication partner facsimile apparatus sends a facsimile thereto.

Further, facsimile apparatuses have a reception rejecting function. The reception rejecting function is a function realized by a facsimile apparatus having registered therein, in advance, the facsimile number set with a communication partner facsimile apparatus, so as to reject the reception of image data sent from the communication partner facsimile apparatus via a facsimile transmission. For example, a user registers in advance, into the facsimile apparatus, the facsimile number of a communication partner that may send, via a facsimile transmission, image data of a facsimile image which the user does not wish to print. By using the reception rejecting function, it is possible to reject the reception of the image data and is therefore possible to prevent the facsimile image represented by the image data from being printed.

Facsimile images for advertisement purposes (called junk faxes) that are unilaterally sent without any prior notice are problematic.

When the sender numbers of such communication partner facsimile apparatuses that send a junk fax are disclosed to the receivers, the sender numbers may be subject to the reception rejection. Thus, some communication partner facsimile apparatuses do not register the sender number thereof on purpose. Accordingly, those communication partner facsimile apparatuses send a facsimile without informing the receiver of the sender number.

To cope with this situation, the reception rejecting function includes a function of rejecting the reception of image data sent via a facsimile transmission without informing the receiver of the sender number.

Facsimile apparatuses are able to perform facsimile communications even if the sender number is not registered therein. Thus, some users forget to register the sender number in the facsimile apparatuses.

When a facsimile is sent from a communication partner facsimile apparatus of which the user has forgotten to register the sender number therein, if a receiving facsimile apparatus is configured with a setting to reject the reception of image data sent via any facsimile transmission without informing the receiver of the sender number, the receiving facsimile apparatus rejects the reception of the image data. In other words, because of the setting where, for the purpose of rejecting the reception of junk faxes, the reception of image data is rejected if sent via a facsimile transmission without informing the receiver of the sender number, it may be impossible to receive some image data sent via facsimile transmissions that actually needs to be received.

To cope with this problem, a notification technique has been proposed by which a communication partner facsimile apparatus that has sent a facsimile without informing the receiver of the sender number is prompted to configure a setting so as to inform receivers of the sender number.

SUMMARY

A facsimile apparatus according to the present disclosure uses IP addresses in facsimile communications. The facsimile apparatus includes: a communicating section, a printing section, an IP address registering section, an IP address obtaining section, a printing rejection processing section, a printing rejection information storing section, and a notifying section. The communicating section is configured to receive image data that is sent from a communication partner apparatus via a facsimile transmission, on a basis of an IP address set with the communication partner apparatus and an IP address set with the facsimile apparatus. The printing section is configured to print a facsimile image represented by the image data received by the communicating section. The IP address registering section is configured to register therein, in advance, one or more IP addresses set with one or more communication partner apparatuses each of which sends image data of a facsimile image that should be printed, to the facsimile apparatus via a facsimile transmission. The IP address obtaining section is configured to obtain the IP address set with the communication partner apparatus when the communication partner apparatus has sent a facsimile to the facsimile apparatus. The printing rejection processing section is configured to, when the facsimile sent from the communication partner apparatus to the facsimile apparatus was sent via a sender-number-undisclosed facsimile transmission, judge whether the IP address obtained by the IP address obtaining section is one of the registered IP addresses that have already been registered in the IP address registering section or an unregistered IP address that has not yet been registered therein and to perform a printing rejecting process if the obtained IP address is determined to be the unregistered IP address. The printing rejection information storing section is configured to, if the obtained IP address is determined to be the unregistered IP address, store therein a specifying image and the unregistered IP address as one piece of printing rejection information. The notifying section is configured to provide one or more pieces of printing rejection information stored in the printing rejection information storing section as a notification. The sender-number-undisclosed facsimile transmission is to send the facsimile from the communication partner apparatus to the facsimile apparatus, without informing the facsimile apparatus of a facsimile number set with the communication partner apparatus. The printing rejecting process is a process of preventing the printing section from printing the facsimile image represented by the image data sent via the sender-number-undisclosed facsimile transmission. The specifying image is an image used for specifying the facsimile image represented by the image data sent via the sender-number-undisclosed facsimile transmission.

DETAILED DESCRIPTION

Figure 1:
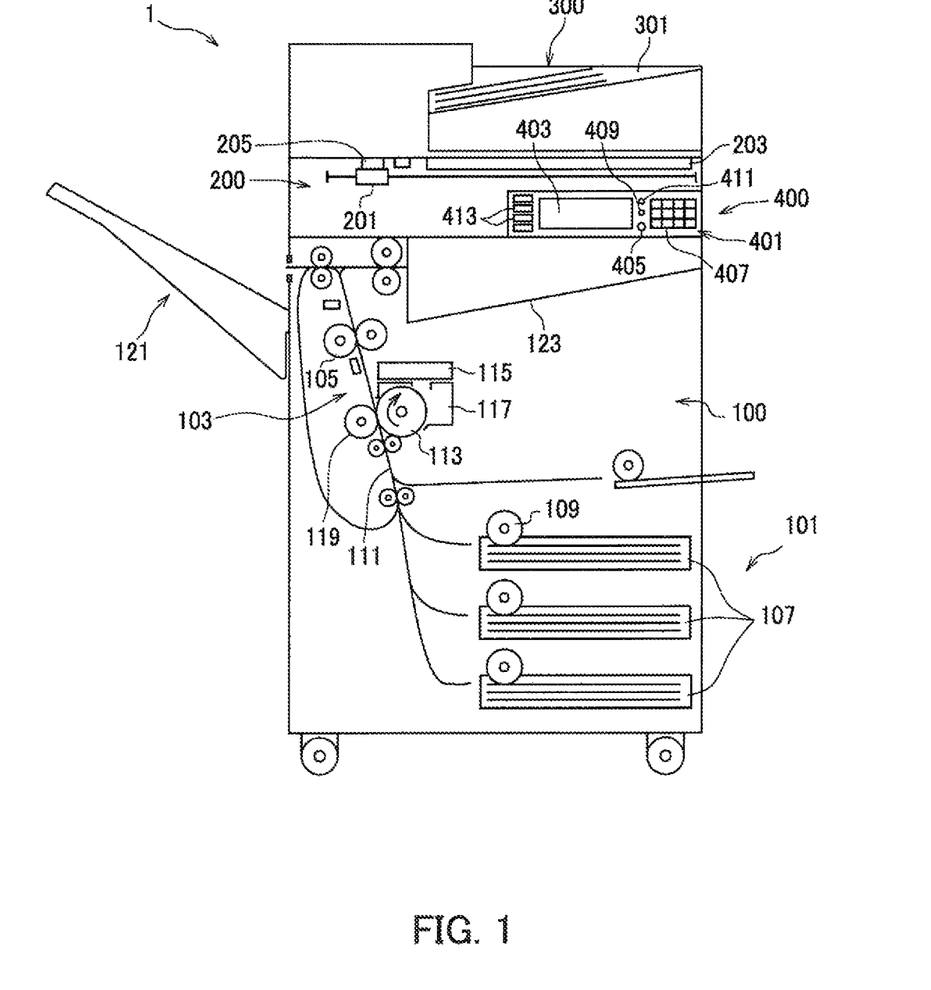
FIG. 1 is an explanatory diagram for explaining an outline of an internal structure of an image forming apparatus according to a first embodiment of the present disclosure.

The following describes embodiments of the present disclosure in detail, on the basis of the accompanying drawings. FIG. 1 is an explanatory diagram for explaining an outline of an internal structure of an image forming apparatus 1 (a specific example of the facsimile apparatus) according to a first embodiment. For example, the image forming apparatus 1 may be applied to a digital multifunction peripheral that has functions of copying, scanning, and sending a facsimile. The image forming apparatus 1 uses IP addresses in facsimile communications. The image forming apparatus 1 includes: an apparatus main body 100; an original document reading section 200 provided over the apparatus main body 100; an original document feeding section 300 provided over the original document reading section 200; and an operating section 400 provided on the front face in an upper part of the apparatus main body 100.

The original document feeding section 300 functions as an automatic original document forwarding device. The original document feeding section 300 is capable of sequentially forwarding a plurality of original documents placed on an original document placement section 301 to the original document reading section 200. The original document reading section 200 sequentially reads the original documents.

The original document reading section 200 includes: a carriage 201 that has installed thereon an exposure lamp and the like; a document table 203 configured with a transparent material such as glass; a Charge Coupled Device (CCD) sensor (not shown in the drawings); and an original document reading slit 205. When an original document placed on the document table 203 is read, the original document is read by the CCD sensor, while the carriage 201 is being moved in the longitudinal direction of the document table 203. In contrast, when an original document fed from the original document feeding section 300 is read, the carriage 201 is moved to a position opposite to the original document reading slit 205, so that the original document forwarded from the original document feeding section 300 is read by the CCD sensor through the original document reading slit 205. The CCD sensor outputs data of the read original document as image data.

The apparatus main body 100 includes a paper storing section 101, an image forming section 103, and a fixing section 105. The paper storing section 101 includes a paper tray 107. The paper tray 107 is positioned at the lowest part of the apparatus main body 100 and is able to store a bundle of paper therein. The uppermost sheet of paper in the bundle of paper stored in the paper tray 107 is forwarded into a paper conveyance path 111 as a result of a pickup roller 109 being driven. The paper is conveyed to the image forming section 103 via the paper conveyance path 111.

The image forming section 103 forms a toner image on the paper that has been conveyed thereto. The image forming section 103 includes a photosensitive drum 113, an exposure section 115, a developing section 117, and a transferring section 119. The exposure section 115 generates light that is modulated in accordance with image data (e.g., the image data output from the original document reading section 200, image data received as a facsimile, or the like) and radiates the generated light onto the circumferential surface of the photosensitive drum 113 that is electrically charged uniformly. On the circumferential surface of the photosensitive drum 113, an electrostatic latent image corresponding to the image data is formed. By supplying toner to the circumferential surface of the photosensitive drum 113 from the developing section 117, while the electrostatic latent image is being formed on the circumferential surface of the photosensitive drum 113, the toner image corresponding to the image data is formed on the circumferential surface of the photosensitive drum 113. The toner image is transferred by the transferring section 119 onto the paper described above that has been conveyed thereto from the paper storing section 101.

The paper onto which the toner image has been transferred is forwarded to the fixing section 105. At the fixing section 105, heat and pressure are applied to the toner image and the paper, so that the toner image is fixed on the paper. The paper is then discharged into a stack tray 121 or an exit tray 123.

The operating section 400 includes an operation key section 401 and a display section 403. The display section 403 has a touch panel function and is configured to display a screen including software keys thereon. By operating the software keys while viewing the screen, a user is able to configure settings and the like that are necessary for implementing any of the functions such as copying.

The operation key section 401 is provided with operations keys that are configured with hardware keys. More specifically, the following keys are provided: a start key 405; a numeric key pad 407; a stop key 409; a reset key 411; and a function switching keys 413 used for switching among the copying function, the scanning function, and the facsimile function.

The start key 405 is a key used for starting an operation such as copying, sending a facsimile, or the like. The numeric key pad 407 is a key pad used for inputting numerals such as the number of copies, a facsimile number, or the like. The stop key 409 is a key used for cancelling a copying operation or the like in progress. The reset key 411 is a key used for returning any settings that have been configured, to an initial setting state.

The function switching keys 413 include a copy key, a transmission key, and the like and are used for switching between the copying function, the transmission function, and the like. When the user operates the copy key, an initial screen for copying is displayed on the display section 403. When the user operates the transmission key, an initial screen for a facsimile transmission is displayed on the display section 403.

Figure 2:
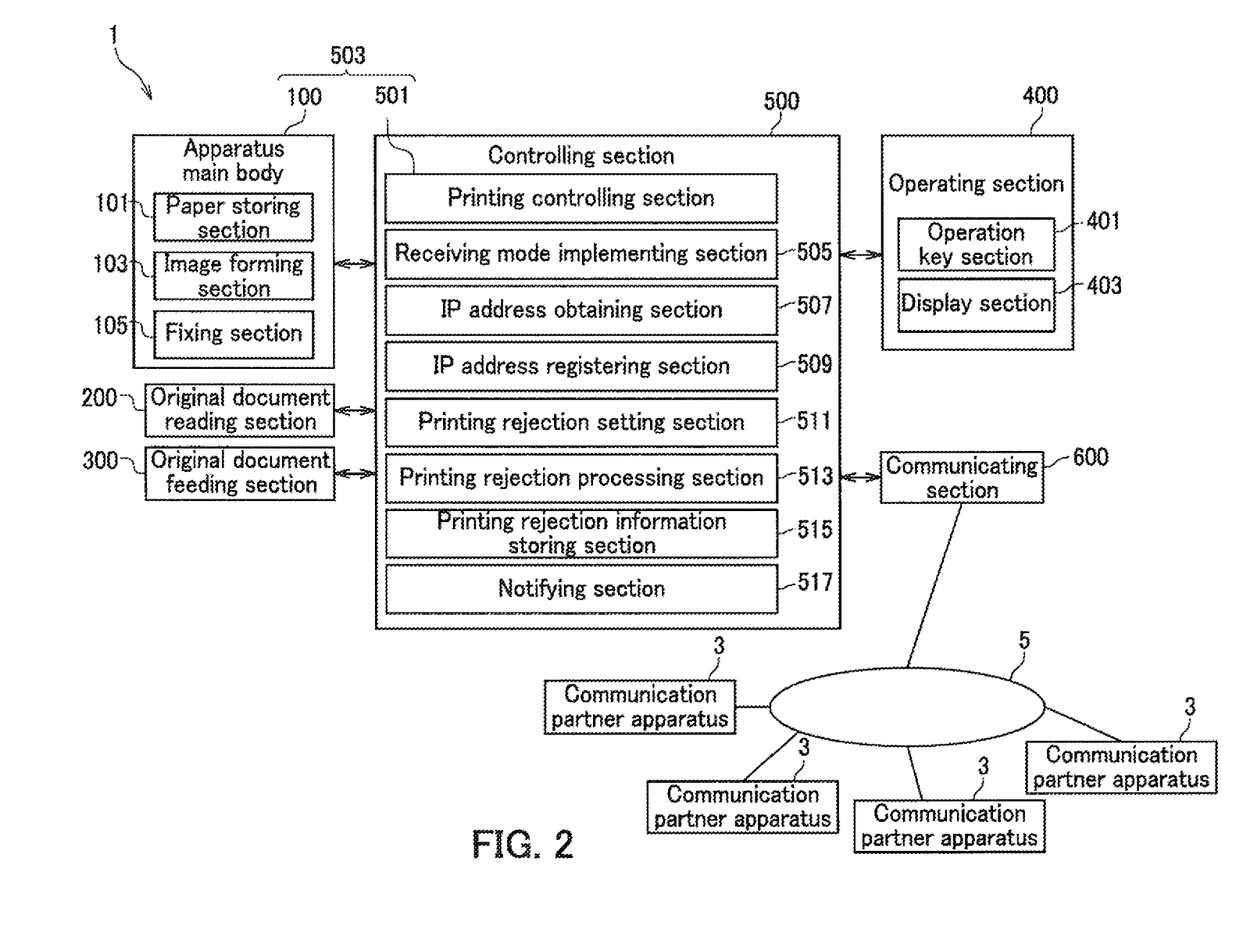
FIG. 2 is a block diagram that shows a configuration of the image forming apparatus according to the first embodiment of the present disclosure.

FIG. 2 is a block diagram that shows a configuration of the image forming apparatus 1 shown in FIG. 1. The image forming apparatus 1 has the configuration in which the apparatus main body 100, the original document reading section 200, the original document feeding section 300, the operating section 400, a controlling section 500, and a communicating section 600 are connected to one another via a bus. Because the configurations of the apparatus main body 100, the original document reading section 200, the original document feeding section 300, and the operating section 400 have already been explained, the explanation thereof will be omitted.

The communicating section 600 is connected to a large number of unspecified communication partner apparatuses 3 via an Internet Protocol (IP) network 5. Each of the communication partner apparatuses 3 is an apparatus having a facsimile function such as, for example, a facsimile machine, a multifunction peripheral having a facsimile function, or a personal computer having a facsimile function.

The communicating section 600 performs a facsimile communication with any of the communication partner apparatuses 3, by using the Session Initiation Protocol (SIP) and the IP network 5. Thus, the image forming apparatus 1 uses Internet Protocol (IP) addresses in facsimile communications. In other words, on the basis of (by using) an IP address set with any of the communication partner apparatuses 3 and an IP address set with the image forming apparatus 1, the communicating section 600 receives image data that is sent thereto from the communication partner apparatus 3 via a facsimile transmission or sends image data to the communication partner apparatus 3 via a facsimile transmission.

The controlling section 500 includes a Central Processing Unit (CPU), a Read Only Memory (ROM), a Random Access Memory (RAM), an image memory, and the like. The CPU exercises control that is necessary for the operation of the image forming apparatus 1, over the constituent elements of the image forming apparatus 1 described above such as the apparatus main body 100. The ROM stores therein software that is necessary for controlling the operation of the image forming apparatus 1. The RAM is used, for example, for temporarily storing data that is generated during execution of software and for storing application software. The image memory temporarily stores therein image data (e.g., the image data output from the original document reading section 200, image data received as a facsimile, and the like).

The controlling section 500 includes, as functional blocks thereof, a printing controlling section 501, a receiving mode implementing section 505, an IP address obtaining section 507, an IP address registering section 509, a printing rejection setting section 511, a printing rejection processing section 513, a printing rejection information storing section 515, and a notifying section 517.

The printing controlling section 501 causes the apparatus main body 100 to perform a process of printing an image represented by image data onto paper, by controlling the apparatus main body 100. The printing controlling section 501 and the apparatus main body 100 structure a printing section 503. The printing section 503 prints a facsimile image represented by the image data received by the communicating section 600.

The receiving mode implementing section 505 selectively implements an automatic receiving mode and a manual receiving mode. The automatic receiving mode is a mode in which, when any of the communication partner apparatuses 3 has sent a facsimile to the image forming apparatus 1, the communicating section 600 of the image forming apparatus 1 automatically receives the image data sent via the facsimile transmission. The manual receiving mode is a mode in which, as a result of an operation performed on the operating section 400 by the user of the image forming apparatus 1, the communicating section 600 of the image forming apparatus 1 manually receives image data sent from any of the communication partner apparatuses 3 via a facsimile transmission.

When the user selects the automatic receiving mode by performing an operation on the operating section 400, the receiving mode implementing section 505 implements the automatic receiving mode. In contrast, when the user selects the manual receiving mode by performing an operation on the operating section 400, the receiving mode implementing section 505 implements the manual receiving mode.

When a facsimile communication is performed between the communicating section 600 and a communication partner apparatus 3 by using SIP and the IP network 5, the IP address obtaining section 507 obtains the IP address set with the communication partner apparatus 3. Accordingly, when a communication partner apparatus 3 has sent a facsimile to the image forming apparatus 1, the IP address obtaining section 507 obtains the IP address set with the communication partner apparatus 3.

The IP address registering section 509 has registered therein, in advance, IP addresses set with communication partner apparatuses 3 each of which sends image data of a facsimile image that should be printed by the image forming apparatus 1, to the image forming apparatus 1 via a facsimile transmission.

The printing rejection setting section 511 can select or unselect a first printing rejection setting and/or a second printing rejection setting, when the user of the image forming apparatus 1 performs an operation on the operating section 400.

The first printing rejection setting is a setting in which the communicating section 600 is caused to reject the reception of image data sent to the image forming apparatus 1 from a communication partner apparatus 3 via a facsimile transmission. More specifically, the user of the image forming apparatus 1 performs an operation on the operating section 400 so as to input the facsimile number set with a communication partner apparatus 3 that sends unwanted image data to the image forming apparatus 1 via a facsimile transmission (i.e., a communication partner apparatus 3 from which the user wishes to receive no facsimile) With this arrangement, the communicating section 600 rejects the reception of the unwanted image data. Consequently, it means that printing of the facsimile image represented by the unwanted image data is rejected.

The second printing rejection setting is a setting in which, with respect to a facsimile image represented by image data that has been sent to the image forming apparatus 1 from a communication partner apparatus 3 via a sender-number-undisclosed facsimile transmission, the communicating section 600 is caused to receive a part or all of the image data, but the printing section 503 is prevented from printing the facsimile image represented by the image data. The sendernumber-undisclosed facsimile transmission is defined as sending a facsimile from a communication partner apparatus 3 to the image forming apparatus 1, without informing the image forming apparatus 1 of the facsimile number set with the communication partner apparatus 3.

Figure 3:
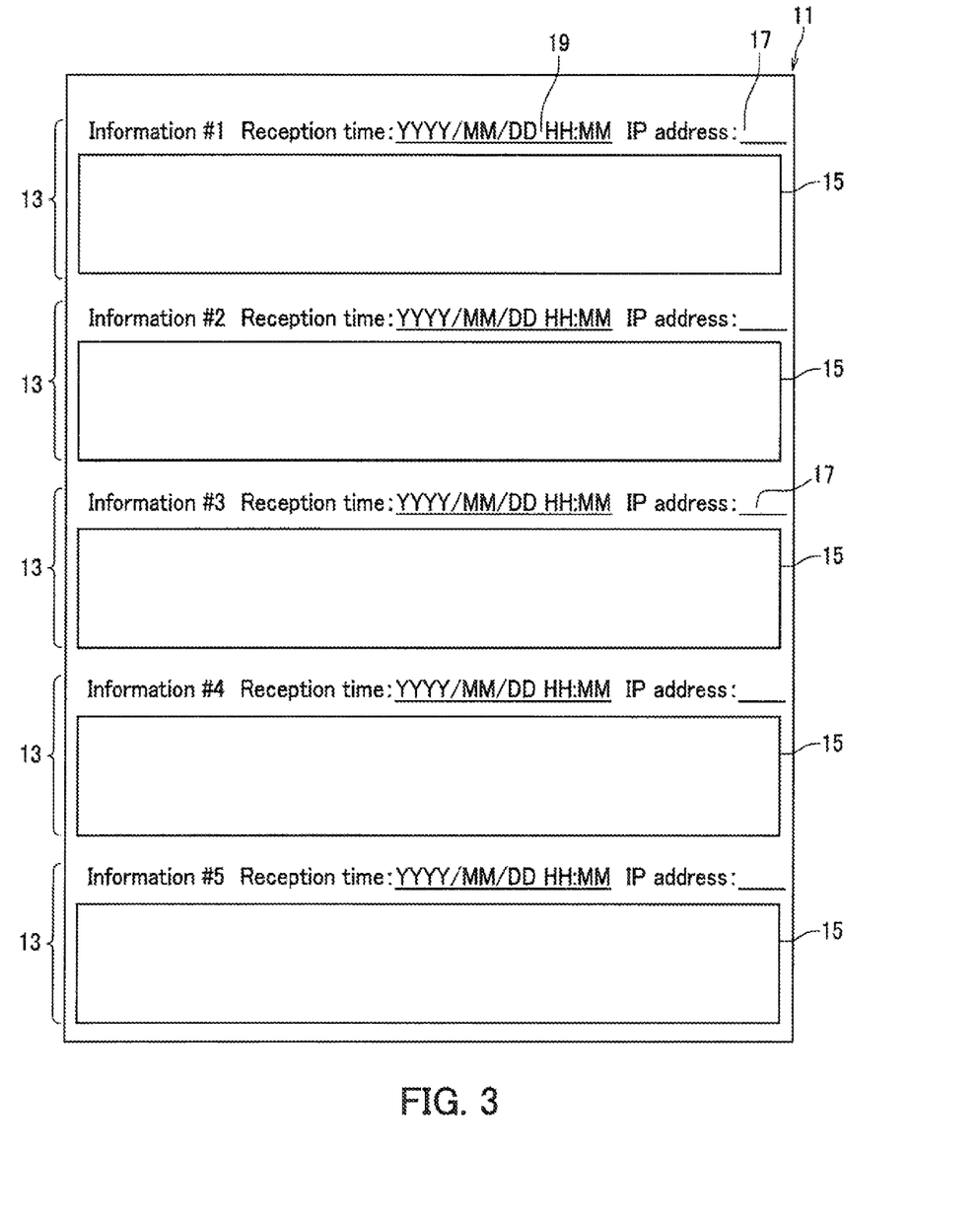
FIG. 3 is an explanatory diagram for explaining an example of a printing rejection fax report generated by the image forming apparatus according to the first embodiment of the present disclosure.

The purpose of causing the communicating section 600 to receive a part or all of the image data is to generate a specifying image 15 (FIG. 3). The specifying image 15 is an image used for specifying the facsimile image represented by the image data sent to the image forming apparatus 1 via the sender-number-undisclosed facsimile transmission. The specifying image 15 may be a reduced image or a partial image of the facsimile image.

The reduced image of the facsimile image is a reduced image of the facsimile image represented by the image data sent to the image forming apparatus 1 via the sender-number-undisclosed facsimile transmission. When the reduced image is used as the specifying image 15, the communicating section 600 receives the entirety of the image data sent to the image forming apparatus 1 via the sender-number-undisclosed facsimile transmission. In contrast, the partial image of the facsimile image is, for example, an image structured with main scanning lines from the main scanning line at the head of the facsimile image to a main scanning line in a predetermined ordinal position. When such a partial image is used as the specifying image 15, the communicating section 600 receives a part of the image data.

While the first printing rejection setting is selected, the printing rejection processing section 513 performs the first printing rejecting process, if the automatic receiving mode is on. On the contrary, if the manual receiving mode is on, the printing rejection processing section 513 does not perform the first printing rejecting process. More specifically, when the automatic receiving mode is on, the printing rejection processing section 513 judges whether the facsimile number set with the communication partner apparatus 3 sending a facsimile to the image forming apparatus 1 is configured in the printing rejection setting section 511. If the facsimile number is configured in the printing rejection setting section 511, the printing rejection processing section 513 causes the communicating section 600 to reject the reception of the image data sent to the image forming apparatus 1 via the facsimile transmission. On the contrary, if the facsimile number is not configured in the printing rejection setting section 511, the printing rejection processing section 513 causes the communicating section 600 to receive the image data sent to the image forming apparatus 1 via the facsimile transmission.

While the second printing rejection setting is selected, the printing rejection processing section 513 performs the second printing rejecting process, if the automatic receiving mode is on. On the contrary, if the manual receiving mode is on, the printing rejection processing section 513 does not perform the second printing rejecting process. More specifically, as described above, when the communication partner apparatus 3 has sent a facsimile to the image forming apparatus 1, the IP address obtaining section 507 obtains the IP address set with the communication partner apparatus 3. When a communication partner apparatus 3 has sent a facsimile to the image forming apparatus 1 via a sender-number-undisclosed facsimile transmission while the automatic receiving mode is on, the printing rejection processing section 513 judges whether the IP address obtained by the IP address obtaining section 507 is one of the registered IP addresses that have already been registered in the IP address registering section 509 or an unregistered IP address that has not yet been registered therein.

When having determined that the IP address obtained by the IP address obtaining section 507 is one of the registered IP addresses, the printing rejection processing section 513 causes the printing section 503 to print the facsimile image represented by the image data sent to the image forming apparatus 1 via the sender-number-undisclosed facsimile transmission.

When having determined that the obtained IP address is an unregistered IP address, the printing rejection processing section 513 performs a printing rejecting process. The printing rejecting process is a process of preventing the printing section 503 from printing the facsimile image represented by the image data sent to the image forming apparatus 1 via the sender-number-undisclosed facsimile transmission.

After that, when the IP address obtained by the IP address obtaining section 507 has been determined to be an unregistered IP address, the printing rejection information storing section 515 stores therein the specifying image 15 and the unregistered IP address as one piece of printing rejection information 13 (FIG. 3). The specifying image 15 is the image used for specifying the facsimile image represented by the image data sent to the image forming apparatus 1 by the sender-number-undisclosed facsimile transmission. As explained above, the specifying image 15 may be a partial image or a reduced image of the facsimile image.

The notifying section 517 notifies the user of printing rejection information 13 stored in the printing rejection information storing section 515. More specifically, with respect to a plurality of pieces of printing rejection information 13 stored in the printing rejection information storing section 515, the notifying section 517 causes the printing section 503 to print two or more pieces of printing rejection information 13 collectively on one sheet of paper. The notifying section 517 notifies the user of the printing rejection information 13 by providing the user with the one sheet of paper having the collectively-printed pieces of information. If one piece of printing rejection information 13 was printed on one sheet of paper, the consumption amount of paper would be the same as when a junk fax is received and printed. This would not make it possible to reduce the consumption amount of paper. Accordingly, it is desirable to print two or more pieces of printing rejection information 13 on one sheet of paper. The notifying section 517, however, is also able to cause the printing section 503 to print one piece of printing rejection information 13 on one sheet of paper.

More specifically, when the quantity of pieces of printing rejection information 13 stored in the printing rejection information storing section 515 has reached a predetermined number (e.g., 5), the notifying section 517 causes the printing section 503 to print the predetermined number of pieces of printing rejection information 13 collectively on the one sheet of paper. The printed material will be referred to as a printing rejection fax report 11. FIG. 3 is an explanatory diagram for explaining an example of the printing rejection fax report 11. The explanation will be continued on the assumption that the predetermined number is five.

Five pieces of printing rejection information 13 are printed in the printing rejection fax report 11. In each piece of printing rejection information 13, a specifying image 15, an unregistered IP address 17, and a reception time 19 are printed. In the example shown in FIG. 3, each of the specifying images 15 is a partial image of the facsimile image represented by the image data sent to the image forming apparatus 1 via a sender-number-undisclosed facsimile transmission. Each of the unregistered IP addresses 17 is an IP address set with the communication partner apparatus 3 that performed the sender-number-undisclosed facsimile transmission. Each of the reception times 19 indicates the time (a date [YYYY/MM/DD], hours [HH], and minutes [MM]) at which the image forming apparatus 1 received the sender-number-undisclosed facsimile transmission.

In the example shown in FIG. 3, each of the specifying images 15 is an image structured with main scanning lines from the main scanning line at the head to a main scanning line in a predetermined ordinal position of a facsimile image represented by the image data sent to the image forming apparatus 1 via a sender-number-undisclosed facsimile transmission. When the IP address obtained by the IP address obtaining section 507 is determined to be an unregistered IP address, i.e., when a sender-number-undisclosed facsimile has been sent to the image forming apparatus 1, the communicating section 600 receives, out of the image data sent via the sender-number-undisclosed facsimile transmission, such data that structures the partial image (the specifying image 15) and that corresponds to the main scanning lines from the main scanning line at the head to the main scanning line in the predetermined ordinal position, instead of receiving the data that structures the facsimile image and that corresponds to the main scanning lines from the main scanning line at the head to the main scanning line at the end. With this arrangement, it is possible to reduce processing loads of the communicating section 600.

Figure 4:
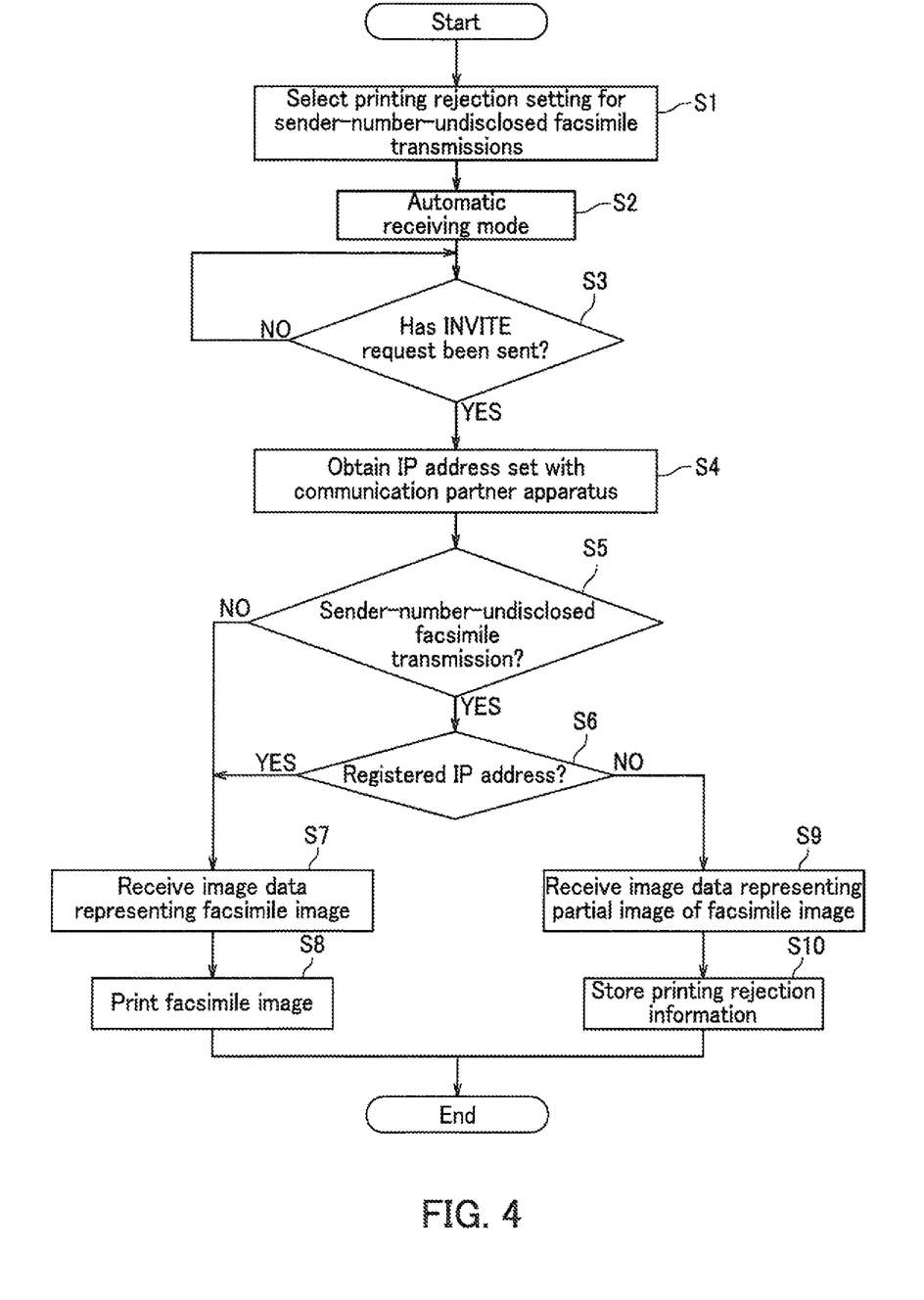
FIG. 4 is a flowchart for explaining a second printing rejecting process performed by the image forming apparatus according to the first embodiment of the present disclosure.

Next, the second printing rejecting process will be explained further in detail. FIG. 4 is a flowchart for explaining the second printing rejecting process. The printing rejection setting section 511 has selected the setting (the second printing rejection setting) in which no image data sent to the image forming apparatus 1 via a sender-number-undisclosed facsimile transmission will be printed (step S1). The printing rejection setting section 511 may or may not select the first printing rejection setting.

The receiving mode implementing section 505 is implementing the automatic receiving mode (step S2). To receive image data sent to the image forming apparatus 1 via a facsimile transmission, SIP and the IP network 5 are used.

The communicating section 600 judges whether an INVITE request has been sent thereto (step S3).

If the communicating section 600 does not determine that an INVITE request has been sent thereto (step S3: No), the process at step S3 is repeatedly performed.

If the communicating section 600 determines that an INVITE request has been sent thereto (step S3: Yes), the communicating section 600 receives the INVITE request. The IP address obtaining section 507 obtains the IP address set with the communication partner apparatus 3 included in the INVITE request (step S4).

After receiving the INVITE request, the communicating section 600 establishes a SIP session between the communicating section 600 and the communication partner apparatus 3.

After the SIP session is established, the printing rejection processing section 513 judges whether the facsimile transmission from the communication partner apparatus 3 is a sender-number-undisclosed facsimile transmission or not (step S5).

When having determined that the facsimile transmission is a sender-number-undisclosed facsimile transmission (step S5: Yes), the printing rejection processing section 513 judges whether the IP address obtained by the IP address obtaining section 507 at step S4 is one of the registered IP addresses that have already been registered in the IP address registering section 509 (step S6).

If the printing rejection processing section 513 has determined that the IP address obtained at step S4 is one of the registered IP addresses (step S6: Yes), the communicating section 600 receives the image data sent to the image forming apparatus 1 via the facsimile transmission from the communication partner apparatus 3 that is set with the IP address included in the INVITE request received at step S3 (step S7). The printing rejection processing section 513 causes the printing section 503 to print a facsimile image represented by the image data received at step S7 (step S8).

On the contrary, if the printing rejection processing section 513 does not determine that the IP address obtained at step S4 is one of the registered IP addresses (step S6: No), i.e., if the obtained IP address is determined to be an unregistered IP address, the communicating section 600 receives, out of the image data sent to the image forming apparatus 1 via the facsimile transmission from the communication partner apparatus 3 set with the IP address included in the INVITE request received at step S3, such data that structures a specifying image 15 and that corresponds to the main scanning lines from the main scanning line at the head to the main scanning line in a predetermined ordinal position, instead of receiving the data that structures the facsimile image and that corresponds to the main scanning lines from the main scanning line at the head to the main scanning line at the end (step S9).

The printing rejection information storing section 515 stores therein the specifying image 15 represented by the image data received at step S9 and the IP address (the unregistered IP address) obtained at step S4, as one piece of printing rejection information 13 (step S10).

On the contrary, if the printing rejection processing section 513 determines that the facsimile transmission is not a sender-number-undisclosed facsimile transmission (step S5: No), i.e., if the communication partner apparatus 3 has sent the facsimile to the image forming apparatus 1 while informing the image forming apparatus 1 of the facsimile number set with the communication partner apparatus 3, the process proceeds to step S7.

When the quantity of pieces of printing rejection information 13 stored in the printing rejection information storing section 515 has reached a predetermined number (e.g., 5), the printing section 503 outputs the printing rejection fax report 11 shown in FIG. 3. Another arrangement is also acceptable where the printing section 503 is caused to output the printing rejection fax report 11 when the user performs an operation on the operating section 400 shown in FIG. 2 so as to input an instruction indicating that the printing rejection fax report 11 should be output. In that situation, any number of pieces of printing rejection information 13 that are stored in the printing rejection information storing section 515 at the point in time when the instruction is input to indicate that the printing rejection fax report 11 should be output are output as a printing rejection fax report 11.

For each of the five pieces of printing rejection information 13, the user judges whether the facsimile image that was not printed is a junk fax or not. Because each of the specifying images 15 is a partial image of the facsimile image, the user is able to judge whether the facsimile is a junk fax or not by viewing the specifying image 15.

If the user has determined that the facsimile image that was not printed is not a junk fax, i.e., that the facsimile image is a facsimile image that should have been printed, it is necessary to ensure that facsimile images be printed next time and thereafter, even if the facsimile transmissions from the communication partner apparatus 3 are sender-number-undisclosed facsimile transmissions.

Accordingly, the user inputs the IP address (the unregistered IP address 17) included in the piece of printing rejection information 13 of the facsimile image that is not a junk fax, to the IP address registering section 509, by performing an operation on the operating section 400. For example, when having determined that the third piece of printing rejection information 13 ("Information #3" in FIG. 3) is a piece of printing rejection information 13 of a facsimile image that is not a junk fax, the user inputs the unregistered IP address 17 included in the third piece of printing rejection information 13 to the IP address registering section 509.

As a result, the IP address registering section 509 has registered therein the unregistered IP address 17 that has been input thereto. Consequently, when the communication partner apparatus 3 set with the registered IP address sends facsimiles to the image forming apparatus 1 via sender-number-undisclosed facsimile transmissions next time and thereafter, the image forming apparatus 1 will print the facsimile images.

Next, advantageous effects of the first embodiment will be explained. During a facsimile communication that uses IP addresses in a facsimile communication, such as a facsimile communication using SIP, when a communication partner apparatus 3 sends a facsimile to the image forming apparatus 1, the image forming apparatus 1 is informed of the IP address set with the communication partner apparatus 3. When a sender-number-undisclosed facsimile has been sent to the image forming apparatus 1 according to the first embodiment, the image forming apparatus 1 judges whether the facsimile is a junk fax or not by using the IP address of which the image forming apparatus 1 is informed.

To explain more specifically with reference to FIG. 4, when the communication partner apparatus 3 has sent the facsimile to the image forming apparatus 1 via the sender-number-undisclosed facsimile transmission (step S5: Yes), the printing rejection processing section 513 judges whether or not the IP address set with the communication partner apparatus 3 is one of the registered IP addresses that have already been registered in the IP address registering section 509 (step S6). If the printing rejection processing section 513 has determined that the IP address is not one of the registered IP addresses (step S6: No), the printing rejection processing section 513 prevents the printing section 503 from printing the facsimile image represented by the image data sent to the image forming apparatus 1 via the sender-number-undisclosed facsimile transmission at step S5 (steps S9 and S10). On the contrary, if the printing rejection processing section 513 has determined that the IP address is one of the registered IP addresses (step S6: Yes), the printing rejection processing section 513 causes the communicating section 600 to receive the image data sent to the image forming apparatus 1 via the sender-number-undisclosed facsimile transmission at step S5 (step S7), and causes the printing section 503 to print the facsimile image represented by the received image data (step S8).

Consequently, even if the printing rejection setting section 511 has selected the setting (the second printing rejection setting) in which the printing is rejected for any facsimile image represented by image data sent to the image forming apparatus 1 via a sender-number-undisclosed facsimile transmission, as long as the IP addresses set with the communication partner apparatuses 3 that may send facsimile images that should be printed are registered in the IP address registering section 509 in advance, the image forming apparatus 1 is able to receive the image data sent from any of those communication partner apparatuses 3 via a sender-number-undisclosed facsimile transmission and is able to print a facsimile image represented by the image data. For example, even if a communication partner apparatus 3 sends, not a junk fax, but a facsimile image that should be printed, via a sender-number-undisclosed facsimile transmission, the image forming apparatus 1 is able to print the facsimile image. Further, even if the user of the communication partner apparatus 3 has forgotten to register the sender number into any of the communication partner apparatuses 3, the image forming apparatus 1 is able to print the facsimile image. Consequently, the image forming apparatus 1 according to the first embodiment is able to print the facsimile image represented by the image data that is sent, via a facsimile transmission, from the communication partner apparatus 3 of which the registration of the sender number has been forgotten, while preventing junk faxes from being printed.

Further, according to the first embodiment, the printing rejection processing section 513 performs the process (the second printing rejecting process) of rejecting the printing of the facsimile image represented by the image data sent to the image forming apparatus 1 via the sender-number-undisclosed facsimile transmission if the automatic receiving mode is on (step S2 in FIG. 4) and does not perform the second printing rejecting process if the manual receiving mode is on. The reason is that, if the manual receiving mode is on, the user of the image forming apparatus 1 is able to reject the reception of junk faxes, by not performing the operation of receiving the image data sent via facsimile transmissions.

Further, according to the first embodiment, the user is notified of the pieces of printing rejection information 13 each of which includes a specifying image 15 and an unregistered IP address, by being provided with the printing rejection fax report 11 as shown in FIG. 3. If the dimension of the display section 403 (FIG. 1) is too small or if the display section 403 is capable of displaying text but not images, the display section 403 is not able to display the specifying images 15. The first embodiment is particularly effective in those situations.

Next, a second embodiment will be explained while a focus is placed on differences from the first embodiment. In the first embodiment, the user is notified of the printing rejection information 13 as a result of the printing of the printing rejection fax report 11. In the second embodiment, the user is notified of the printing rejection information 13 as a result of the display section 403 displaying the printing rejection information 13.

Figure 5:
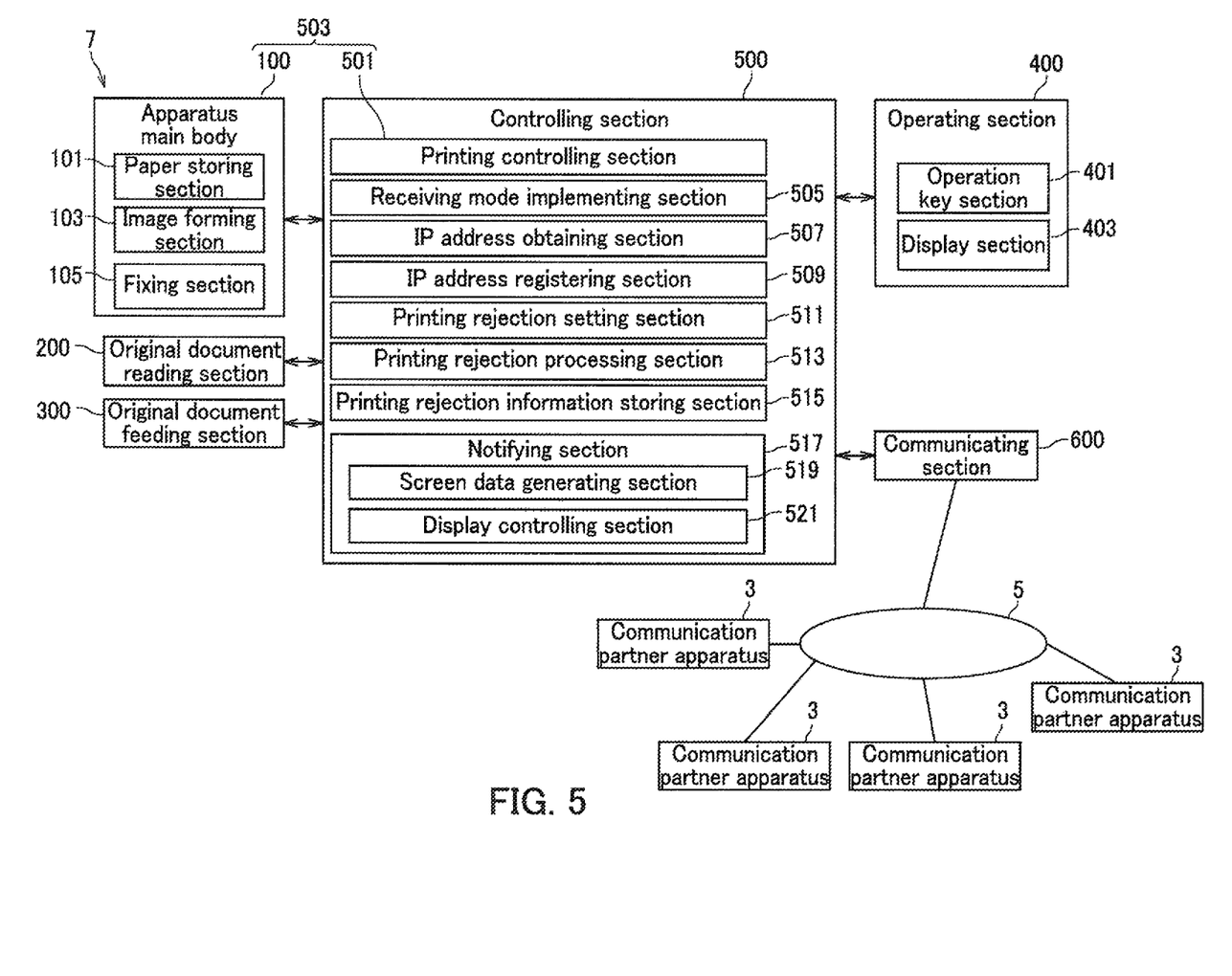
FIG. 5 is a block diagram that shows a configuration of an image forming apparatus according to a second embodiment of the present disclosure.

FIG. 5 is a block diagram that shows a configuration of an image forming apparatus 7 according to the second embodiment. The difference from the image forming apparatus 1 according to the first embodiment shown in FIG. 2 is that the notifying section 517 includes a screen data generating section 519 and a display controlling section 521. In the second embodiment, the screen data generating section 519, the display controlling section 521, and the display section 403 structure the notifying section 517. The notifying section 517 notifies the user of the printing rejection information 13 stored in the printing rejection information storing section 515.

Figure 6:
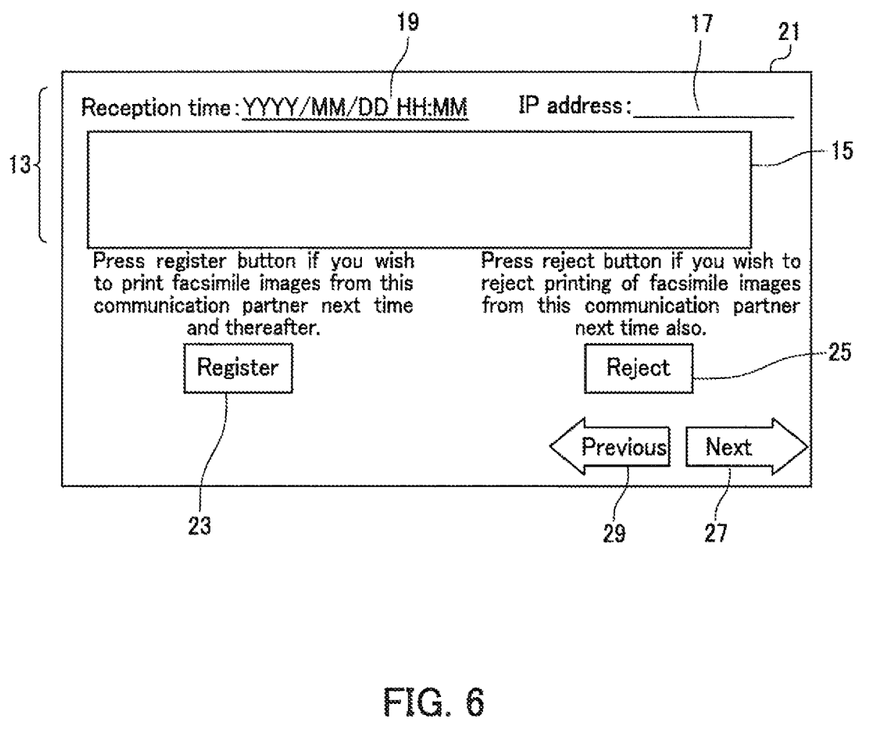
FIG. 6 is an explanatory diagram for explaining an example of a registration screen displayed on a display section of the image forming apparatus according to the second embodiment of the present disclosure.

The controlling section 500 includes, as functional blocks thereof, the screen data generating section 519 and the display controlling section 521. The screen data generating section 519 generates screen data of a registration screen 21 (FIG. 6). The registration screen 21 is a screen used for registering any unregistered IP address into the IP address registering section 509. The screen data of the registration screen 21 includes a specifying image 15.

When the user performs an operation on the operating section 400 so as to input an instruction indicating that the registration screen 21 should be displayed, the screen data generating section 519 generates the screen data of the registration screen 21 on the basis of the printing rejection information 13 stored in the printing rejection information storing section 515.

The display controlling section 521 causes the display section 403 to display the registration screen 21 represented by the screen data generated by the screen data generating section 519.

FIG. 6 is an explanatory diagram for explaining an example of the registration screen 21 displayed on the display section 403. One piece of printing rejection information 13 is displayed on the registration screen 21. The one piece of printing rejection information 13 includes the specifying image 15, an unregistered IP address 17, and a reception time 19. These displayed items are already explained in relation to the printing rejection fax report 11 shown in FIG. 3.

The registration screen 21 includes software keys 23 and 25. These keys are used for judging whether each unregistered IP address 17 should be registered into the IP address registering section 509 or not. More specifically, with respect to the piece of printing rejection information 13 included in the registration screen 21, the user judges whether the facsimile image that was not printed is a junk fax or not. The specifying image 15 is a partial image of the facsimile image. Accordingly, the user is able to judge whether the facsimile image is a junk fax or not by viewing the specifying image 15.

If the facsimile image that was not printed is determined as not being a junk fax, i.e., that the facsimile image is a facsimile image that should have been printed, it is necessary to ensure that facsimile images be printed next time and thereafter, even if facsimile transmissions from the communication partner apparatus 3 are sender-number-undisclosed facsimile transmissions.

To this end, the user presses the software key 23 included in the registration screen 21. As a result, the IP address registering section 509 registers therein the unregistered IP address 17 included in the piece of printing rejection information 13 of the facsimile image that is not a junk fax. Accordingly, even if the communication partner apparatus 3 that is set with the IP address sends facsimiles to the image forming apparatus 7 via sender-number-undisclosed facsimile transmissions next time and thereafter, the image forming apparatus 7 will print the facsimile images.

On the contrary, if the facsimile image that was not printed is determined as a junk fax, it is necessary to ensure that facsimile images not be printed next time and thereafter either, the facsimile images being represented by image data sent to the image forming apparatus 7 from the communication partner apparatus 3 via facsimile transmissions.

To this end, the user presses the software key 25 included in the registration screen 21. As a result, the IP address registering section 509 does not register therein the unregistered IP address 17 included in the piece of printing rejection information 13 of the facsimile image that is a junk fax. Accordingly, even if the communication partner apparatus 3 that is set with the IP address sends facsimiles to the image forming apparatus 7 via sender-number-undisclosed facsimile transmissions next time and thereafter, the image forming apparatus 7 will reject the printing of the facsimile images because of the sender-number-undisclosed facsimile transmissions.

When the software key 23 is pressed, the printing rejection information storing section 515 performs a process of deleting the piece of printing rejection information 13 displayed on the registration screen 21 from the printing rejection information storing section 515. With this arrangement, next time when the user performs an operation on the operating section 400 so as to input an instruction that the registration screen 21 should be displayed, the registration screen 21 related to the piece of printing rejection information 13 will not be displayed on the display section 403.

The registration screen 21 includes software keys 27 and 29. When the software key 27 is pressed, the display controlling section 521 causes the display section 403 to display a registration screen 21 related to a piece of printing rejection information 13 that is subsequent to the current piece. In contrast, when the software key 29 is pressed, the display controlling section 521 causes the display section 403 to display a registration screen 21 related to a piece of printing rejection information 13 that is previous to the current piece.

In the second embodiment, the registration screen 21 is displayed by the display section 403 included in the image forming apparatus 7. However, if the image forming apparatus 7 is operated via a personal computer, it is also acceptable to cause the registration screen 21 to be displayed on a screen of the personal computer operated by the user. With this arrangement, the user is able to make the judgment described above of whether the facsimile image that was not printed is a junk fax or not, by using the personal computer. Further, the user is able to perform the operation of registering the unregistered IP address into the IP address registering section 509, by using the personal computer. In that situation, the screen data representing the registration screen 21 and having been generated by the screen data generating section 519 is sent to the personal computer by the communicating section 600.

It is also acceptable to carry out the first embodiment and the second embodiment in combination. In other words, it is possible to have an arrangement in which the user is able to select from between the printing rejection fax report 11 being output and the registration screen 21 being displayed on the display section 403 by performing an operation on the operating section 400.

As explained above with reference to FIGS. 1 to 6, the facsimile apparatuses according to the present disclosure are able to prevent the junk faxes from being printed.

What is claimed is:

1. A facsimile apparatus that uses IP addresses in facsimile communications, comprising:
   a communicating section configured to receive image data that is sent from a communication partner apparatus via a facsimile transmission, on a basis of an IP address set with the communication partner apparatus and an IP address set with the facsimile apparatus;
   a printing section configured to print a facsimile image represented by the image data received by the communicating section;
   an IP address registering section configured to register therein, in advance, one or more IP addresses set with one or more communication partner apparatuses each of which sends image data of a facsimile image that should be printed, to the facsimile apparatus via a facsimile transmission;
   an IP address obtaining section configured to obtain the IP address set with the communication partner apparatus when the communication partner apparatus has sent a facsimile to the facsimile apparatus;
   a printing rejection processing section configured to, when the facsimile sent from the communication partner apparatus to the facsimile apparatus was sent via a sender-number-undisclosed facsimile transmission, judge whether the IP address obtained by the IP address obtaining section is one of the registered IP addresses that have already been registered in the IP address registering section or an unregistered IP address that has not yet been registered therein and to perform a printing rejecting process if the obtained IP address is determined to be the unregistered IP address;

a printing rejection information storing section configured to, if the obtained IP address is determined to be the unregistered IP address, store therein a specifying image and the unregistered IP address as one piece of printing rejection information; and a notifying section configured to provide a notification by causing the printing section to print a printing rejection fax report containing pieces of printing rejection information stored in the printing rejection information storing section as a notification, wherein the sender-number-undisclosed facsimile transmission is to send the facsimile from the communication partner apparatus to the facsimile apparatus, without informing the facsimile apparatus of a facsimile number set with the communication partner apparatus, the printing rejecting process is a process of preventing the printing section from printing the facsimile image represented by the image data sent via the sender-number-undisclosed facsimile transmission, the specifying image is an image to be printed in the printing rejection fax report and used for specifying the facsimile image represented by the image data sent via the sender-number-undisclosed facsimile transmission, with respect to a plurality of pieces of printing rejection information stored in the printing rejection information storing section, the notifying section causes the printing section to print two or more of the plurality of pieces of printing rejection information collectively in the printing rejection fax report composed of a single sheet of paper, each of the pieces of printing rejection information includes a pair made up of a specifying image and an unregistered IF' address, and the printing section prints, in the printing rejection fax report composed of a single sheet of paper, two or more pairs each made up of a specifying image and an unregistered IP address in list form.

2. A facsimile apparatus according to claim 1, wherein if the IP address obtained by the IP address obtaining section is determined to be one of the registered IP addresses, the printing rejection processing section performs a process of causing the printing section to print the facsimile image represented by the image data sent via the sender-number-undisclosed facsimile transmission.

3. A facsimile apparatus according to claim 1, wherein when a quantity of pieces of printing rejection information stored in the printing rejection information storing section has reached a predetermined number, the notifying section causes the printing section to print the printing rejection fax report containing the predetermined number of pieces of printing rejection information on a single sheet of paper.

4. A facsimile apparatus according to claim 1, wherein the specifying image is a partial image of the facsimile image represented by the image data that has been sent via the sender-number-undisclosed facsimile transmission.

5. A facsimile apparatus according to claim 4, wherein if the IP address obtained by the IP address obtaining section is determined to be the unregistered IP address, the communicating section receives, out of the image data sent via the sender-number-undisclosed facsimile transmission, such data that structures the partial image and that corresponds to main scanning lines from a main scanning line at a head to a main scanning line in a predetermined ordinal position.

6. A facsimile apparatus according to claim 4, wherein the specifying image is the partial image of the facsimile image, and if the IP address obtained by the IP address obtaining section is determined to be the unregistered IP address, the communicating section receives as the partial image only a part of the image data representing the facsimile image, without receiving the entirety of the image data representing the facsimile image.

7. A facsimile apparatus according to claim 1, wherein the notifying section includes a screen data generating section configured to generate screen data of a registration screen used for registering any unregistered IP address into the IP address registering section, and the screen data includes data representing the specifying image.

8. A facsimile apparatus according to claim 7, wherein the notifying section further includes:
a display section; and
a display controlling section configured to cause the display section to display the registration screen represented by the screen data.

9. A facsimile apparatus according to claim 7, wherein the screen data generating section generates the screen data of the registration screen on a basis of the printing rejection information.

10. A facsimile apparatus according to claim 1, further comprising:
a receiving mode implementing section configured to selectively implement an automatic receiving mode in which the image data sent via the facsimile transmission is automatically received and a manual receiving mode in which the image data sent via the facsimile transmission is manually received, wherein the printing rejection processing section performs the printing rejecting process while the automatic receiving mode is being implemented and does not perform the printing rejecting process while the manual receiving mode is being implemented.

11. A facsimile apparatus according to claim 1, further comprising:
an operating section; and
a printing rejection setting section configured to select or unselect a printing rejection setting, wherein the printing rejection setting is a setting in which the printing section is prevented from printing the facsimile image represented by the image data sent via the sender-number-undisclosed facsimile transmission, and while the printing rejection setting is selected, the printing rejection processing section performs the printing rejecting process.

12. A facsimile apparatus according to claim 1, wherein the specifying image is a reduced image of the facsimile image represented by the image data that has been sent via the sender-number-undisclosed facsimile transmission.

* * * * *